United States Patent

[11] 3,604,295

[72] Inventors Martin Ronald Newton Clark
Ickenham;
Joseph Henry Hill, Greenford; Herbert Ernest Preston, Maidenhead, all of, England
[21] Appl. No. 7,697
[22] Filed Feb. 2, 1970
[45] Patented Sept. 14, 1971
[73] Assignee Vandervell Products Limited
London, England
[32] Priority Feb. 7, 1969
[33] Great Britain
[31] 6823/69

[54] METHOD OF CUTTING LAMINATED STRIP MATERIAL
4 Claims, 2 Drawing Figs.
[52] U.S. Cl. .................................................. 83/9,
83/42, 83/519
[51] Int. Cl. ................................................. B26d 3/00,
B26d 11/00
[50] Field of Search ........................................ 83/9, 39, 1, 42, 519

[56] References Cited
UNITED STATES PATENTS
2,141,121  12/1938  Attwood....................... 83/9 X
3,237,494   3/1966  Norvelle....................... 83/9

Primary Examiner—Frank T. Yost
Attorney—Mawhinney & Mawhinney

ABSTRACT: A method of cutting laminated strip material of the type having a hard backing with a soft layer bonded to the backing comprising cutting through the soft layer to the interface with the backing and then shearing through the backing along a line extending to one side of one of the faces formed on the soft layer by the first cutting operation so that the bond between the part of the soft layer on which said one face is formed and the backing is not damaged by the second cutting operation.

PATENTED SEP 14 1971 3,604,295
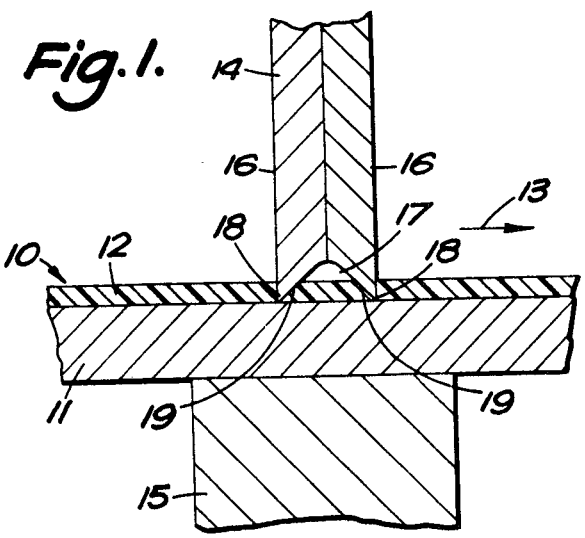
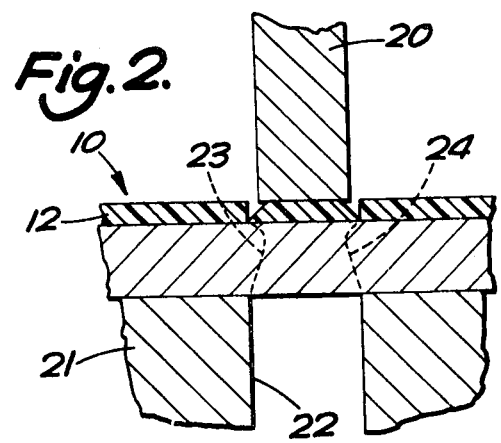

METHOD OF CUTTING LAMINATED STRIP MATERIAL

This invention relates to methods of cutting through laminated strips of material of the type comprising two adjacent layers which are bonded to one another and in which one of the adjacent layers is relatively soft and the other of the adjacent layers is relatively hard. For example the laminated strip may comprise a steel or other metallic backing having a layer of polymeric material on one side thereof, although the invention is not restricted to strips having two layers and could be used for strips having three or more layers.

The invention provides a method of cutting a laminated strip material of the type defined hereinbefore comprising a first cutting operation in which a cut is made through the soft layer of the material up to its interface with the harder layer and a second cutting operation in which a cut is made through the harder layer, the second cut being made along a line spaced sufficiently from one of the faces formed by the first cutting operation on the relatively soft layer so that distortion of the harder layer caused by the second cutting operation does not extend to the bond between the part of the relatively soft layer having said one face and the harder layer.

The first cutting operation may comprise cutting a groove in the softer layer having a face extending normally to the surface of the strip and a face extending obliquely to the surface of the strip and the second cutting operation is spaced sufficiently from the normally extending face so that distortion of the harder layer by the second cutting operation does not extend to the bond between the part of the soft layer having said normal face and the adjacent part of the hard layer.

The second cutting operation may be a shearing operation.

In the case where the strip is required to be cut simultaneously at two adjacent locations, the first cutting operations in the softer layer of material may be carried out simultaneously and the second cutting operations in the harder layer may also be carried out simultaneously at locations between the cuts formed by the first cutting operation so that the bonds between the soft layers and harder layers of the ends of the strip on either side of the part removed by the two cutting operations are not damaged.

The following is a description of one embodiment of the invention reference being made to the accompanying diagrammatic drawings in which:

FIG. 1 is a sectional view of an apparatus for cutting an upper layer of a two layer laminated strip; and FIG. 2 is a sectional view of an apparatus for shearing through the lower layer of the strip.

Referring firstly to FIG. 1 of the drawings there is shown a strip of laminated material indicated generally by the reference numeral 10 which comprises a hard metallic backing 11 and a layer 12 of a soft polymeric material bonded to the upper face of the backing element. The strip 10 is fed step by step in the direction of the arrow 13 through an apparatus for partially cutting through the strip at two spaced locations comprising a tool 14 which is reciprocated by means (not shown) towards and away from the strip to operate on the strip whilst it is stationary between movements and an anvil 15 on which the strip is supported.

The tool 14 extends across the width of the strip and comprised two cutting blades 16 each of which has a cutting edge 17 at the lower end thereof. The blades are arranged face to face with one another so that their cutting edges 17 are spaced apart.

The tool 14 has reached the lower limit of its travel in the position shown in FIG. 1 and the cutting edges 18 have penetrated the upper layer 12 of the strip up to the interface with the backing 11. The tool 14 forms two spaced grooves in the upper layer 12 each having a vertical sidewall and an inclined sidewall.

Referring now to FIG. 2 of the drawings, after passing through the apparatus shown in FIG. 1 the strip 10 is fed in step by step manner to a tool for completing the two cuts started in the apparatus shown in FIG. 1. The tool comprises a reciprocating punch 20 which extends across the width of the strip and a die 21 on which the strip rests having an opening 22 for receiving the punch.

The width of the opening 22 is equal to the spacing of the vertical faces formed in the upper layer 12 by the first cutting operations and the width of the punch 20 is less than that of the opening in the die.

The step by step movement of the strip 10 is arranged to bring the part of the strip subjected to the first cutting operations into a position in which the two vertical faces on the upper layer of the strip are directly above and in line with the side faces of the opening 22. The punch is forced downwardly through the die 22 to shear the backing 11 along the shear lines 23 and 24. The shear lines 23 and 24 start in the upper part of the backing at locations spaced between the vertical faces on the layer 12. The width of the punch 20 is selected so that distortion in the upper part of the backing does not extend to the parts of the backing layer to which the parts of the upper layer having the vertical faces are joined. Thus the bonds between those parts of the upper layer and their respective parts of the backing layer are not damaged by the shearing operations. The part of the strip which is sheared out is discarded.

The cutting operations are repeated at predetermined distances along the strip to produce lengths of strip suitable for manufacture into bearing liners or bushes.

By way of example in the case of a composite strip having a metallic backing layer of 0.051 inch in thickness and a surface layer of polymeric material of 0.009 inch in thickness, the first two cutting operations may be made at locations spaced 0.211 inch apart and the second cutting operations may be effected by a punch having a width of 0.187 inch and a die having an opening 0.191 inch across.

We claim:

1. A method of cutting a laminated strip material of the type defined hereinbefore comprising a first cutting operation in which a cut is made through the soft layer of the material up to its interface with the harder layer and a second cutting operation in which a cut is made through the harder layer, the second cut being made along a line spaced sufficiently from one of the faces formed by the first cutting operation on the relatively soft layer so that distortion of the harder layer caused by the second cutting operation does not extend to the bond between the part of the relatively soft layer having said one face and the harder layer.

2. A method as claimed in claim 1 wherein the first cutting operation comprises cutting a groove in the softer layer having a face extending normally to the surface of the strip and a face extending obliquely to the surface of the strip and the second cutting operation is spaced sufficiently from the normally extending face so that distortion of the harder layer by the second cutting operation does not extend to the bond between the part of the soft layer having said normal face and the adjacent part of the hard layer.

3. A method as claimed in claim 1 wherein the second cutting operation is a shearing operation.

4. A method as claimed in claim 1 wherein the strip is required to be cut simultaneously at two adjacent locations wherein the first cutting operations in the softer layer of material are carried out simultaneously and the second cutting operations in the harder layer are also carried out simultaneously at locations between the cuts formed by the first cutting operation so that the bonds between the soft layers and harder layers of the ends of the strip on either side of the part removed by the two cutting operations are not damaged.